(12) United States Patent
Nascimento et al.

(10) Patent No.: US 10,710,041 B2
(45) Date of Patent: Jul. 14, 2020

(54) CYLINDRICAL WALL FOR FILTERING SOLID PARTICLES IN A FLUID

(71) Applicant: TOTAL RAFFINAGE CHIMIE, Courbevoie (FR)

(72) Inventors: Pedro Nascimento, Le Havre (FR); Arnaud Selmen, Le Havre (FR); Matthew Allen, Orange, TX (US)

(73) Assignees: Total Raffinage Chimie, Courbevoie (FR); AMYRIS, INC., Emeryville, CA (US)

( * ) Notice: Subject to any disclaimer, the term of this patent is extended or adjusted under 35 U.S.C. 154(b) by 0 days.

(21) Appl. No.: 16/334,789

(22) PCT Filed: Sep. 18, 2017

(86) PCT No.: PCT/EP2017/073476
§ 371 (c)(1),
(2) Date: Mar. 20, 2019

(87) PCT Pub. No.: WO2018/054839
PCT Pub. Date: Mar. 29, 2018

(65) Prior Publication Data
US 2020/0016559 A1   Jan. 16, 2020

(30) Foreign Application Priority Data

Sep. 20, 2016   (FR) ...................................... 16 58816

(51) Int. Cl.
*B01J 8/02*   (2006.01)
*C10G 11/10*   (2006.01)
*B33Y 80/00*   (2015.01)

(52) U.S. Cl.
CPC ........... *B01J 8/0292* (2013.01); *B01J 8/0214* (2013.01); *B01J 8/0278* (2013.01); *B33Y 80/00* (2014.12);
(Continued)

(58) Field of Classification Search
CPC ..... C04B 38/00; C04B 38/10; C04B 2111/00; C04B 2111/20; C04B 2111/2092;
(Continued)

(56) References Cited

U.S. PATENT DOCUMENTS 2,997,374 A   8/1961   Lavender et al.
3,167,399 A   1/1965   Hansen
(Continued)

FOREIGN PATENT DOCUMENTS

EP   3064268 A1   9/2016
WO   0166239 A2   9/2001

OTHER PUBLICATIONS

F. Pradel et al., "A New Concept of Scallops Screens for Reactors of Refining", Oil and Gas Science and Technology, vol. 56 (2001), No. 6, pp. 597-610.
(Continued)

*Primary Examiner* — Natasha E Young
(74) *Attorney, Agent, or Firm* — Albert Shung

(57) ABSTRACT

A cylindrical wall for filtering solid particles in a fluid is disclosed herein, through which a fluid is likely to circulate. This wall includes at least one perforated plate having a finite radius of curvature, and at least one grating element superposed on this perforated plate. The grating element includes a plurality of rigid wires extending in a longitudinal direction and positioned adjacent to one another in order to filter the solid particles, characterized in that the grating element is arranged for the wires to be secured to one another only by means of links between adjacent wires, each link between two adjacent wires occupying only a portion of the length of the wires, and having a thickness less than or equal to the thickness of these wires in proximity to this link.

14 Claims, 2 Drawing Sheets

(52) U.S. Cl.
CPC ..... *C10G 11/10* (2013.01); *B01J 2208/00884* (2013.01); *C10G 2300/1096* (2013.01); *C10G 2400/30* (2013.01)

(58) Field of Classification Search
CPC ..... Y02W 30/00; Y02W 30/50; Y02W 30/90; Y02W 30/91; Y02W 30/95
See application file for complete search history.

(56) References Cited

U.S. PATENT DOCUMENTS

| | | |
|---|---|---|
| 2008/0107575 A1 | 5/2008 | Vetter et al. |
| 2009/0211965 A1* | 8/2009 | Parr ................ B01D 29/445 210/488 |
| 2015/0014242 A1 | 1/2015 | Smith et al. |

OTHER PUBLICATIONS

International Search Report issued in Application No. PCT/EP2017/073476, dated Dec. 4, 2017 5 pages.

* cited by examiner

CYLINDRICAL WALL FOR FILTERING SOLID PARTICLES IN A FLUID

CROSS-REFERENCE TO RELATED APPLICATIONS

This application claims the benefit of PCT/EP2017/073476, now WO 2018/054839, filed Sep. 18, 2017, which claims priority from FR 1658816 filed Sep. 20, 2016, which are incorporated herein by reference in their entireties for all purposes.

The invention relates to a cylindrical wall for filtering solid particles, for example a radial flow catalyst bed wall. The invention can be applied for example in catalytic reformers, in reforming regenerators, in the context of other dehydrogenation transformation methods, and more generally in the context of any method for filtering solid particles in a fluid by means of a cylindrical wall.

The documents U.S. Pat. Nos. 3,167,399, 2,997,374 and the article by F. Pradel et al., (2001) "A New Concept of Scallops Screens for Reactors of Refining", published in the Oil and Gas Science and Technology review, describe examples of radial flow reactors.

This type of reactor can for example be used in catalytic reforming units, in other dehydrogenation transformation units, or even in catalytic reforming regenerator units.

Catalytic reforming makes it possible to convert naphthene molecules into aromatic molecules having a higher octane index for the purposes of obtaining motor vehicle fuel.

The reforming can be regenerative or semi-regenerative. In the case of regenerative reforming, catalyst can circulate between concentric cylindrical walls of a radial flow catalyst bed. In the case of semi-regenerative reforming, the catalyst is simply contained in the annular space defined by the concentric walls.

Figure 1:
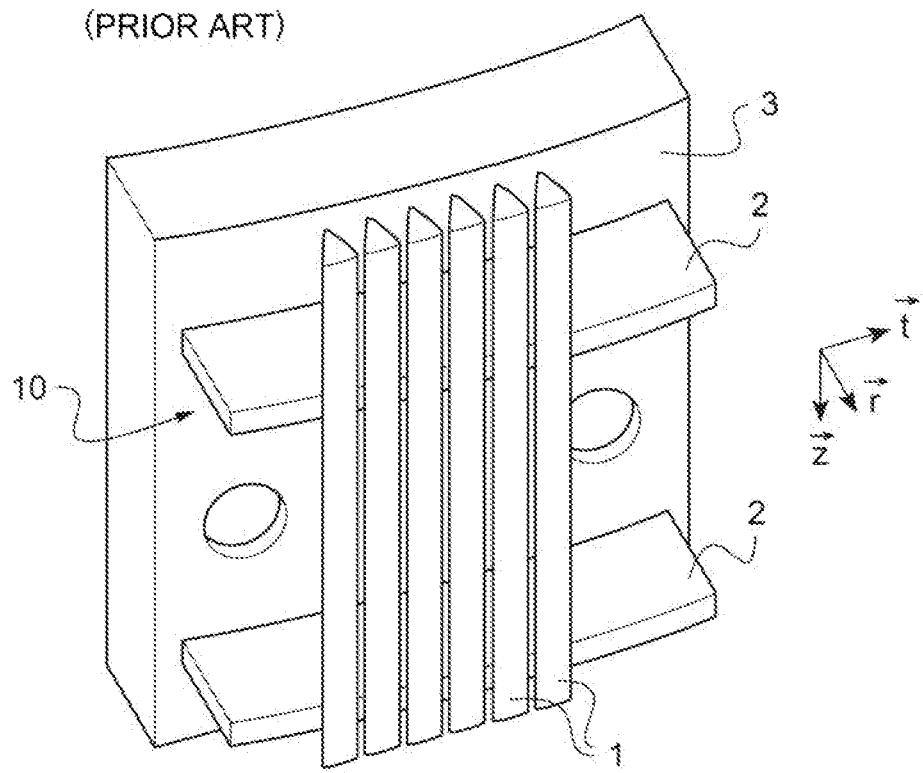

FIG. 1 shows a portion of an exemplary cylindrical filtering wall according to the prior art, for a catalytic reformer. A cylindrical wall of a radial flow catalyst bed conventionally comprises a perforated plate 3 forming a cylindrical element, only a part of which is represented in FIG. 1, and a grating 10, also represented only in part, forming another cylindrical element, these cylindrical elements being concentric.

The grating 10 is designed to be in contact with the catalyst that is not represented. The grating 10 comprises flats 2 each extending in a tangential direction and arranged at various heights and rigid wires 1 extending vertically and secured to the flats by welding. Only a few wires 1 are represented in FIG. 1.

A center pipe wall comprises a perforated plate to ensure mechanical strength. The grating participates in the retention of the catalyst in the annular space.

In order for the grating to form a cylindrical element, all of the ends of flats 2 are secured to the perforated plate 3 by means of a vertical weld seam not represented in FIG. 1. This weld seam prevents the passage of catalyst to the perforated plate.

The documents WO 01/66239 and US 2008/0107575 describe outer basket walls, produced from several hollow longitudinal ducts, each corresponding to an angular range.

The grating is designed and dimensioned according to the installation for which it is intended. For example, in the case of a wall with hollow longitudinal ducts, of the type of those described in the abovementioned documents, grating elements will be provided with flats having a length and a radius of curvature that are a function of the expected duct structures.

There is a need for a more adaptable grating.

There is proposed a cylindrical wall for filtering solid particles in a fluid, through which this fluid is likely to circulate, this wall comprising at least one perforated plate having a finite radius of curvature, and at least one grating element superposed on this perforated plate, this grating element comprising a plurality of rigid wires each extending in a longitudinal direction and positioned adjacent to one another in order to filter the solid particles.

According to the invention, the grating element is arranged for the wires to be secured to one another only by means of links between adjacent wires, each link between two adjacent wires occupying only a portion of the length of the wires.

Each link between two wires can have a thickness, in the radial direction, less than or equal to the thickness of these wires in proximity to this link.

Thus, the rigid flats are replaced by links that are relatively localized, in order to allow the fluid to circulate between the wires, and relatively flexible, such that the grating element can be bent relatively easily. It is thus possible to provide for the same grating elements to be manufactured for diverse filtering walls, independently of the radii of curvature of these walls.

Furthermore, the links between the wires being relatively localized, they can be dismantled relatively easily, for example by means of a tool of hacksaw, shear or similar type, again making it possible to adapt to different filtering walls, for example to walls with longitudinal ducts, walls of concentric cylinder structure, or the like.

On the other hand, should a single link be accidentally broken, the corresponding wires can remain in place in so far as these wires are secured to one another and to other wires by means of other links. An accidental break of a link is therefore less consequential than a break of a weld of a wire to a flat in the case of a grating according to the prior art.

"A plurality of wires" is understood to mean a number of wires preferably greater than five, advantageously greater than ten or twenty.

The wires can for example have a thickness, in the radial direction, of the order of one or more millimeters, for example between 0.7 and 20 millimeters, advantageously between 1 and 10 millimeters.

The wires can for example have a width, in the tangential direction, of the order of one or more millimeters, for example between 0.7 and 10 millimeters, advantageously between 1 and 5 millimeters.

The width of the space between two adjacent wires, in the tangential direction, can for example be of the order of a tenth of a millimeter or a millimeter, for example between 0.02 and 10 millimeters, advantageously between 0.5 and 1 millimeter.

Obviously, the dimensions of the wires and their arrangement can be chosen according to the desired application, by taking into account in particular the granule size analysis of the particles to be filtered, to choose in particular the spacing between the wires, and the anticipated rate of circulation of the fluid, to choose in particular the dimensions and the material(s) of the wires.

The links between wires occupy only a portion of the length of the wires, representing for example less than 20% of the length of the wires, advantageously less than 10% of the length of the wires. The links can for example extend in the longitudinal direction over a length of between 0.2 and 20 millimeters, advantageously between 0.7 and 5 millimeters.

Advantageously, at least one and preferably each link between two wires can have a thickness, in the radial direction, less than 0.7 times the thickness in proximity to this link of these two wires, advantageously less than or equal to 0.5 times this thickness, for example less than or equal to 0.4 times this thickness. The localized links can thus be relatively thin, which can make them flexible and possibly easy to break.

Each link between two wires extends radially between an inner link end intended to be facing the perforated plate and an outer link end.

In proximity to this link, each of these two wires extends radially between an inner wire end intended to be facing the perforated plate and an outer wire end.

Advantageously, for at least one, and preferably each, link between two wires, the outer link end is within the outer wire ends of the two adjacent wires, such that these two wires and this link define a groove forming a passage between the inter-wire spaces on either side of this link. The build-up against the link of particles circulating between the wires is thus avoided.

The invention is in no way limited to this groove, and, alternatively, it would be possible to provide for the link to be flush with the outer surface of the wires.

Advantageously, at least one, and preferably each, link between two wires can be produced in the same material as these two wires.

In an advantageous embodiment, the grating element can be obtained by 3D printing, for example by metal 3D printing. It will in particular be possible to use:
- a technology of laser fusion or SML (Selective Laser Melting) type,
- a 5-axis manufacturing technology, for example a DMD (Direct Metal Deposition) method,
- an FDM (Fused Deposition Modeling) technology, for example an electron beam-based additive manufacturing technology, for example the EBAM™ (Electron Beam Additive Manufacturing) technology used by the company Sciaky, Inc., or
- the like.

The manufacturing of the grating element can thus be conducted relatively rapidly, and the logistics can be simplified in so far as the printing can be performed easily on demand.

In one embodiment, the links between the wires can be aligned with one another, but, alternatively and advantageously, it will be possible to provide non-aligned links, for example staggered links, for at least some of the links. Such a distribution of the links over all of the grating element can make it possible to give greater flexibility.

Thus, advantageously, for at least one wire secured to a first and a second adjacent wires situated on either side of said wire, the links securing said wire to the first adjacent wire can be staggered relative to the links securing said wire to the second adjacent wire.

The grating element can comprise two end wires forming two opposite edges of the grating element.

Advantageously, at least one wire can, over at least a part of its length, extend radially toward the perforated plate over a thickness greater than the thickness of other wires of the grating element or than the thickness of this at least one wire over the rest of its length. This or these overthickness(es) can thus make it possible to mechanically strengthen the grating and better absorb any loads having a component in the radial direction.

In one embodiment, at least one wire can, over all of its length, extend radially toward the perforated plate over a thickness greater than the thickness of other wires of the grating element.

In particular, it will be possible to provide for at least one of the two end wires of the grating element to have a thickness greater than the thickness of all or part of other wires of the grating element. The end wires can thus ensure a sealing function, in so far as this overthickness can come to close a possible path for passage of the solid particles via the longitudinal end edges.

Advantageously, at least one wire other than these end wires can also extend radially toward the perforated plate over a thickness greater than the thickness of all or part of other wires of the grating element, thus making it possible to limit the deformations of the grating element in case of loads having a component in the radial direction.

In one embodiment, at least one wire other than these end wires can also extend radially toward the perforated plate over a thickness greater than the thickness of all or part of other wires of the grating element, but less than the thickness of the end wires, thus making it possible to reconcile limiting the deformations in case of radial loads and flexibility of the grating element.

In one embodiment, at least one wire, advantageously several, distinct from the end wires, can, over a portion only of its length, extend radially toward the perforated plate over a thickness greater than the thickness of the rest of its length. The overthickness zones are thus relatively localized, once again making it possible to reconcile limiting the deformations in case of radial loads and flexibility of the grating element.

Advantageously, the portion of the wire along which the wire has such an overthickness can be longer than an orifice diameter of the perforated plate. Any deformations of the grating element at these orifices is thus avoided.

The portions of the wires having a thickness greater than the thickness of all or part of the rest of these wires can advantageously be arranged at one or more end zones of the wires, making it possible to ensure a sealing function, in so far as the particles of a diameter greater than the space between two wires cannot pass under the grating element by using a path via the tangential end edges.

These portions arranged at one or more end zones of the wires can have a thickness equal to the thickness of the end wires.

Alternatively, the wires can have end zones that are slanted, that is to say that, over a zone of for example a few millimeters or centimeters, the thickness of the wire decreases approaching the end of the wire. Such beveled wires can in particular be provided in the case of grating elements to be superposed on another grating element, for example to be screwed onto this other grating element in case of failure of this other grating element.

Portions of the wires having a thickness greater than the thickness of the rest of these wires can advantageously be arranged in locations other than these end zones.

Advantageously, portions of the wires having a thickness greater than the thickness of the rest of these wires can be staggered relative to one another. By virtue of this distribution of the overthickness zones, the grating element can be particularly flexible.

Advantageously, at least one wire has, over all of its length, a section whose width, in the tangential direction, is smaller at a first end of wire section facing the perforated plate than at a second end of wire section opposite this first end, for example a triangular or trapezoidal section. Thus, if the grating element is bent in order to be able to be installed on a cylindrical wall of relatively small radius of curvature, the reduced width of the wires at their inner ends makes it possible to avoid or limit loads due to the contacts between adjacent wires, and to limit the build-up of solid particles between the inner ends of the wires.

The wall described above can for example be a radial flow catalyst bed wall intended to be in contact with a catalyst, or the like.

This wall can for example be a wall with longitudinal ducts, or the like.

Advantageously, this at least one perforated plate can form a perforated cylinder extending in a longitudinal direction.

Advantageously, this at least one grating element can form a grating assembly, of generally cylindrical form, intended to be in contact with the solid particles, the grating assembly and the perforated cylinder being concentric.

It is for example possible to provide for the grating element or elements to be fixed by means of a weld bead, of the type known from the prior art, in order to ensure a fixing of the end edges of the grating element(s) to one another and to the perforated cylinder.

Advantageously, the wall can further comprise means for assembling said at least one grating element in order to form the grating assembly, these assembly means being arranged to ensure a fixing of said at least one dismantlable grating element that can be dismantled from the perforated plate.

Thus, a structure of concentric cylinders is retained, which is simpler to design and manufacture than the structures with longitudinal ducts, and this is done while limiting the mechanical stresses, which makes it possible to limit the shutdowns of reactors compared to the walls of the prior art in which the longitudinal weld is subjected to the loads associated with the expansions of the grating cylinder and with the expansion of the perforated cylinder.

In one embodiment, it is possible to provide a single grating element for the grating assembly, but, advantageously, the grating assembly can comprise several grating elements.

When several grating elements are thus provided, it is possible to manufacture the grating assembly by segments, and, if appropriate, to replace the grating elements independently of one another. For example, if one grating element proves to have failed, it can be removed and replaced by a functional grating element, and this can be done while leaving the other grating elements unchanged.

Advantageously, grating elements will be chosen that are dimensioned to be able to pass through a manhole defined in the reactor, in order to facilitate these operations.

The catalyst bed wall can be a center pipe wall, of relatively small diameter relative to the diameter of a reactor section, or even an outer basket of greater diameter.

Depending on the operating conditions of the unit for which this cylindrical wall is intended, the catalyst may or may not circulate.

The solid particles, for example of catalyst, can for example take the form of grains with a granule size analysis centered around one or a few millimeter(s). For example, the average size of the catalyst grains (of spherical or extruded form) can vary between 0.5 and 5.0 mm, advantageously between 1 and 3 mm. Since the catalyst is subject to erosion and attrition, some of the catalyst grains can have a diameter of between 0.7 and 1.0 mm.

The catalyst is intended to be contained in an annular space between two radial flow catalyst bed walls, at least one of which is as described above.

A fluid is intended to circulate radially, for example from the outside of the outermost wall, or outer basket, to the other so-called center pipe wall. The fluid passes through the catalyst bed and is collected in the center pipe.

Alternatively, the fluid can flow from the center pipe to the outer basket. The grating assembly and the perforated cylinder allow the passage of the fluid while preventing the catalyst from passing into the center pipe or, if appropriate, to the outside of the outer basket.

Generally, the cylindrical wall can be designed to filter particles present outside the cylinder, the fluid entering to the interior of the cylinder and the wires being then arranged outside the cylinder, or else to filter particles present inside the cylinder, the fluid then circulating from the inside to the outside of the cylinder and the perforated plate then being outside the wall.

Also proposed is a reactor comprising a wall as described above, for example a radial flow catalyst bed wall, it being understood that the invention is in no way limited to this exemplary application.

Also proposed is a catalytic reforming unit comprising a reactor as described above.

The wall can be a center pipe wall, or not.

Also proposed is a method for manufacturing a grating element as described above by metal 3D printing.

Also proposed is a cylindrical wall for filtering solid particles in a fluid, through which a fluid is likely to circulate, this wall comprising at least one perforated plate having a finite radius of curvature, and at least one grating element superposed on this perforated plate, this grating element comprising a plurality of rigid wires each extending in a direction having a longitudinal component and positioned adjacent to one another in order to filter the solid particles. The grating element is arranged for the wires to be secured to one another only by means of links between two adjacent wires, each link between two adjacent wires occupying only a portion of the length of the wires and being sufficiently supple for the grating element to be flexible, in order for the grating element to be able to be installed on cylindrical walls of varied diameters.

The invention can be applied for example in catalytic reformers, in reforming regenerators, in the context of other dehydrogenation transformation methods, and more generally in the context of any method for filtering solid particles in a fluid by means of a cylindrical wall.

The invention will be better understood with reference to the figures; which illustrate embodiments given by way of example and that are nonlimiting.

Figure 2:
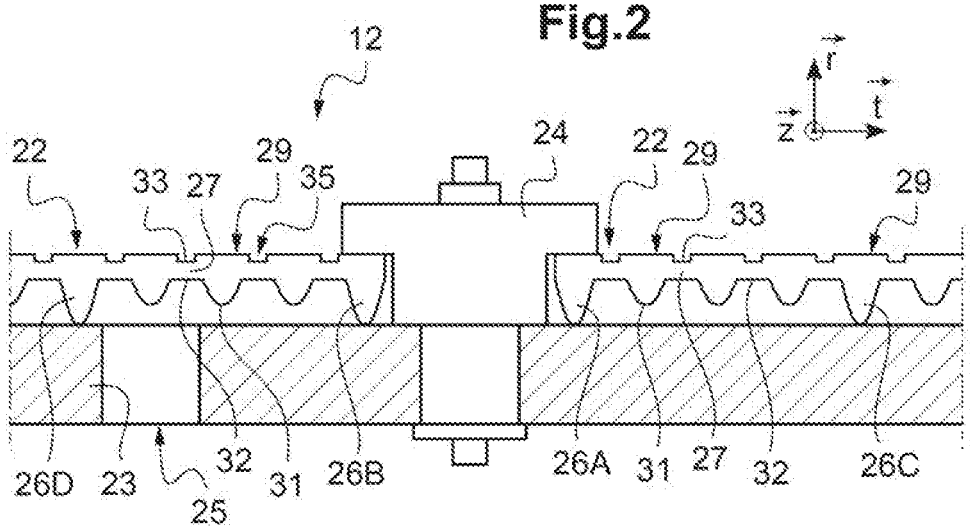
Figure 3:
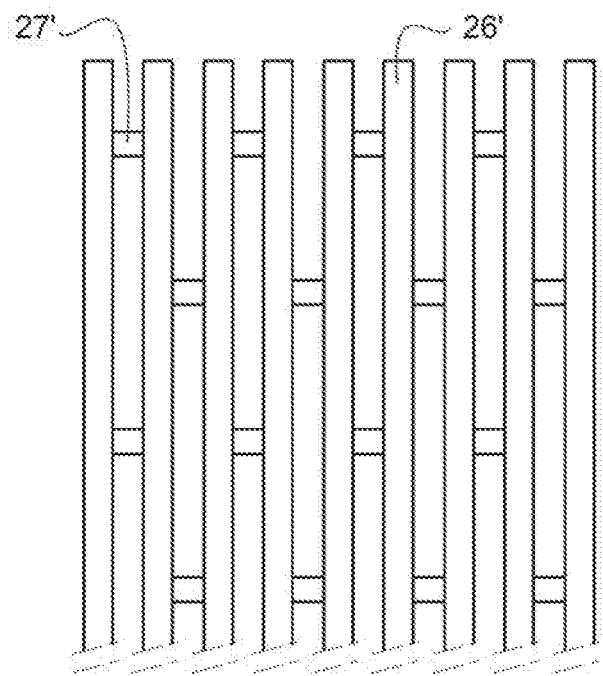
Figure 4:
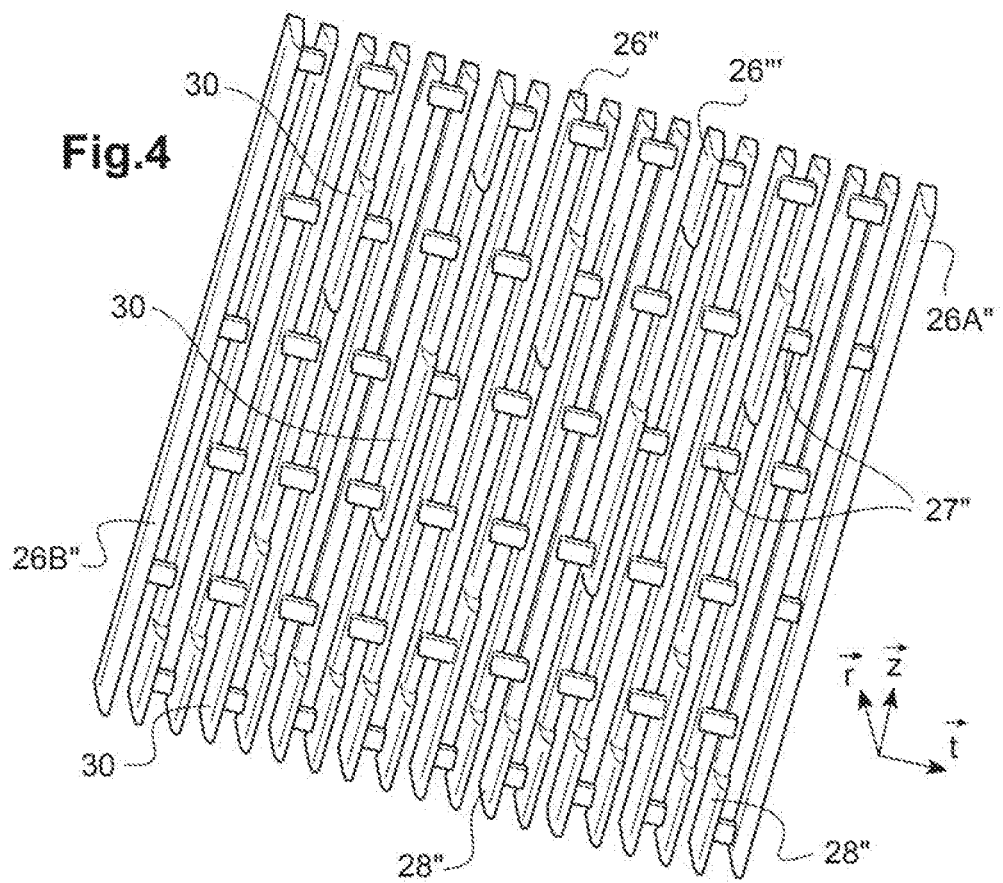

FIG. 1 shows a part of an exemplary catalytic reformer wall according to the prior art, FIG. 2 is a cross-sectional view of an exemplary portion of a radial flow catalyst bed center pipe wall according to an embodiment of the invention, FIG. 3 is a view in the radial direction of an exemplary grating element for a wall according to another embodiment of the invention, FIG. 4 shows an exemplary grating element for a wall according to yet another embodiment of the invention.

The proportions are not necessarily observed from one figure to another.

On the other hand, it will be possible to use identical references from one figure to another to denote identical or similar elements.

Referring to FIG. 2, a reforming reactor that is not represented can comprise an outer basket and a center pipe, of which a portion is represented here.

A center pipe wall 12 comprises grating elements 22 and a perforated plate 23 that are superposed and held together by a flange 24 fixed by means of a nut to the perforated plate 23.

The perforated plate element 23 defines holes 25, the holes 25 having a diameter of the order of 1-2 centimeters.

The perforated plate element has a thickness, in the radial direction, also of the order of a centimeter.

Each grating element 22 is intended to be in contact with a catalyst that is not represented.

Fluid that is not represented is intended to pass through this portion of center pipe 12 by a substantially radial flow.

Each grating element 22 comprises a plurality of wires 26 arranged adjacent in pairs so as to form a sheet.

The wires 26 extend in the longitudinal direction $\vec{z}$.

These wires 26 have a section of roughly triangular form, one of the vertexes 31 of the triangle facing the perforated plate 23, one face 29 of the triangle being in contact with the catalyst.

The top faces 29, intended to be in contact with the solid particles, have a width of approximately 1 or 2 millimeters.

The wires 26 extend radially toward the perforated plate 23 and have a thickness for example of the order of 2 to 4 millimeters.

The catalyst grains can for example have dimensions of the order of a millimeter, for example an average particle diameter between 1.0 and 3.0 millimeters.

Since the space between two adjacent wires is relatively restricted (less than the average diameter of the particles of the catalyst), for example of the order of a half-millimeter, the grating elements 22 participate in the retention of the catalyst and do so despite the passage of the fluid through the wall.

Localized links 27 make it possible to secure the wires in pairs.

The wires and the localized links 27 are produced in metal by 3D printing, for example in iron, in steel, or other such material.

These links 27 extend in the longitudinal direction over for example 1 or 2 millimeters, and have a thickness, in the radial direction, of approximately 1 or 2 millimeters.

Each link 27 extends radially between an inner end 32 and an outer end 33.

The outer end 33 is within the top faces 29 of the wires, that is to say that the inner end 33 is closer to the perforated plate 23 than these faces 29.

Each link 27 therefore defines, with the parts of the adjacent wires in proximity to this link, a groove 35 extending longitudinally, here over 1 or 2 millimeters. These grooves 35 are in continuity with the spaces between the corresponding wires, thus allowing a better circulation of the solid particles.

In this example, these links 27 are aligned with one another.

Thus, each localized link 27 securing two wires to one another is aligned with the two localized links each securing one of these two wires to another wire. Each grating element 22 thus defines sets of localized links, the localized links of each set being aligned with one another. These sets tend to slightly stiffen the grating element.

On the other hand, in the embodiment of FIG. 3, the localized links 27' securing the wires 26' to one another are staggered, and arranged so as to maximize the distances between links, thus making it possible to obtain a particularly flexible grating element.

To return to FIG. 2, wires 26A, 26B at the ends of the grating elements 22 have a thickness, in the radial direction, greater than that of other wires 26, for example a thickness of the order of a centimeter when that of the wires 26 is 4 millimeters. This makes it possible to prevent particles from circulating via a path passing under these end wires.

It is also possible to provide reinforcing wires, in particular a main wire 26D having a thickness that is the same as or close to that of the wires 26A, 26B, and a secondary reinforcing wire 26C having a thickness less than that of the wires 26A, 26B but greater than that of the wires 26, for example approximately 7 or 8 millimeters. These reinforcing wires can make it possible to limit the deformations of the grating element 22 when this element is subjected to radial loads toward the perforated plate 23.

Referring to FIG. 4, the wires 26", 26"' distinct from the end wires 26A", 26B" each have a relatively thick end zone 28". For each of these wires 26", 26"', the corresponding zone 28" is situated at the end of this wire.

Alternatively, in an advantageous embodiment that is not represented, each of the wires distinct from the end wires has an overthickness at each of its two ends.

These overthickness zones at the end(s) of each wire makes it possible to reinforce the filtering, in so far as these zones 28" prevent the circulation of the particles through a passage passing under these ends.

Apart from these overthicknesses located at one of the ends, each wire 26" has a relatively identical section over all of its length, of triangular or flared form.

On the other hand, the wires 26"' have other overthickness zones 30, these zones 30 occupying only a portion of the length of the corresponding wires, for example 2 or 3 centimeters long, and extending radially over a thickness equal to the thickness of the overthickness zones 28" at the end(s) of each wire.

Here, these zones 30 are arranged staggered, that is to say that these overthickness zones 30 are distributed over all of the grating element.

Furthermore, end wires 26A", 26B" also have a relatively great thickness, for example equal to the thickness of the overthickness zones 28" at the end(s) of each wire.

The invention claimed is:

1. A cylindrical wall for filtering solid particles in a fluid, through which this fluid is to circulate, this wall comprising
    at least one perforated plate having a finite radius of curvature, and
    at least one grating element superposed on the perforated plate, the grating element comprising a plurality of rigid wires extending in a longitudinal direction and positioned adjacent to one another in order to filter the solid particles,
    characterized in that
    the grating element is arranged for the wires to be secured to one another only by means of links between adjacent wires, each link between two adjacent wires occupying only a portion of the length of the wires, and having a thickness less than or equal to the thickness of these wires in proximity to the link.

2. The wall as claimed in claim 1, wherein
    each link between two wires extends radially between an inner link end facing the perforated plate and an outer link end,
    in proximity to the link, each of these two wires extends radially between an inner wire end intended to be facing the perforated plate and an outer wire end, characterized in that,
for at least one link between two wires, the outer end of the link is within the outer wire ends of the two adjacent wires, such that these two wires and the link define a groove forming a passage between the spaces between these wires on either side of the link.

3. The wall as claimed in claim 1, wherein at least one wire has, over all of its length, a section whose width, in the tangential direction, is smaller at a first end of wire section facing the perforated plate than at a second end of wire section opposite the first end.

4. The wall as claimed in claim 1, wherein, for at least one wire secured to a first and a second adjacent wires situated on either side of the wire, the links securing the wire to the first adjacent wire are staggered relative to the links securing the wire to the second adjacent wire.

5. The wall as claimed in claim 1, wherein at least one wire extends, over at least a part of its length, radially toward the perforated plate over a thickness greater than the thickness of other wires of the grating element or than the thickness of the at least one wire over the rest of its length.

6. The wall as claimed in claim 5, wherein the grating element comprises two end wires forming two opposite edges of the grating element,
characterized in that at least one of the two end wires of the grating element has a thickness greater than the thickness of all or part of other wires of the grating element.

7. The wall as claimed in claim 5, wherein at least one of the wires distinct from the end wires of the grating element has a thickness greater than the thickness of all or part of other wires of the grating element.

8. The wall as claimed in claim 5, wherein at least one wire distinct from the end wires extends over at least a portion only of its length to at least one end zone of the wire, radially, toward the perforated plate over a thickness greater than the thickness of all or part of the rest of its length.

9. The wall as claimed in claim 5, wherein at least two wires distinct from the end wires extend over at least a portion only of their length, radially toward the perforated plate over a thickness greater than the thickness of the rest of their length, wherein the portions having the greater thickness are arranged staggered relative to one another.

10. The wall as claimed in 1, wherein
the at least one perforated plate forms a perforated cylinder extending in a longitudinal direction,
the at least one grating element forms a grating assembly, of generally cylindrical form, intended to be in contact with the solid particles, and
the grating assembly and the perforated cylinder are concentric.

11. A reactor comprising a wall as claimed in claim 1.

12. A catalytic reforming unit comprising a reactor as claimed in claim 11.

13. The catalytic reforming unit as claimed in claim 12, wherein the wall as claimed in claim 1 is a center pipe wall.

14. A method for manufacturing a grating element for a wall as claimed in claim 1 by metal 3D printing.

* * * * *